US010401182B2

(12) United States Patent
Greenberg et al.

(10) Patent No.: US 10,401,182 B2
(45) Date of Patent: Sep. 3, 2019

(54) SYSTEMS AND METHODS FOR AVOIDING LOCATION-DEPENDENT DRIVING RESTRICTIONS (71) Applicant: GOOGLE LLC, Mountain View, CA (US)

(72) Inventors: Merav Greenberg, Tel-Aviv (IL); Uri Agassi, Tel-Aviv (IL)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/840,272

(22) Filed: Dec. 13, 2017

(65) Prior Publication Data
US 2019/0178660 A1 Jun. 13, 2019

(51) Int. Cl.
G01C 21/36 (2006.01)
G01C 21/34 (2006.01)
G08G 1/01 (2006.01)

(52) U.S. Cl.
CPC ..... *G01C 21/3461* (2013.01); *G01C 21/3655* (2013.01); *G01C 21/3691* (2013.01)

(58) Field of Classification Search
CPC .............. G01C 21/36; G01C 21/3461; G01C 21/3655; G01C 21/3691; G08G 1/01; G08G 1/015; G08G 50/26
(Continued)

(56) References Cited

U.S. PATENT DOCUMENTS 6,362,751 B1   3/2002  Upparapalli
8,326,474 B2   12/2012 Schrey et al.
(Continued)

FOREIGN PATENT DOCUMENTS

CN   106931979 A    7/2017
EP   2 378 249 A1   10/2011

OTHER PUBLICATIONS

The Jakarta Post, "Waze to adapt navigation to Jakarta's odd-even license plate policy," (2017). Retrieved from the Internet on Mar. 14, 2018: URL:http://www.thejakartapost.com/life/2017/08/27/waze-to-adapt-navigation-to-indonesias-odd-even-license-plate-policy.html.

(Continued)

*Primary Examiner* — Tan Q Nguyen
(74) *Attorney, Agent, or Firm* — Marshall, Gerstein & Borun LLP (57) ABSTRACT Systems and methods are provided for generating restriction-based navigation directions to avoid areas having location-dependent driving restrictions. An electronic device receives a user request for navigation directions from an origin location to a destination location. The electronic device determines multiple sets of navigation directions between the origin location and the destination location, and compares each set of navigation directions to locations associated with driving restrictions to identify driving restrictions that apply to the user's request for navigation directions. Based on rules associated with an identified driving restriction, and user-provided information related to the identified driving restriction, the electronic device determines whether the identified driving restriction applies to the user. Then the electronic device identifies a set of navigation directions that avoids locations associated with the identified driving restriction, and presents the identified set of navigation directions on a map display.

20 Claims, 7 Drawing Sheets (58) Field of Classification Search
USPC .......................................................... 701/423
See application file for complete search history.

(56) References Cited

U.S. PATENT DOCUMENTS

| | | | | |
|---|---|---|---|---|
| 9,163,950 | B2* | 10/2015 | Alduaiji | G01C 21/3492 |
| 2004/0102898 | A1* | 5/2004 | Yokota | G01C 21/3691 |
| | | | | 701/414 |
| 2005/0107944 | A1* | 5/2005 | Hovestadt | G01C 21/3484 |
| | | | | 701/423 |
| 2008/0059055 | A1* | 3/2008 | Geelen | G01C 21/32 |
| | | | | 701/533 |
| 2014/0067259 | A1* | 3/2014 | Walsh | G08G 1/09626 |
| | | | | 701/437 |
| 2016/0232785 | A1* | 8/2016 | Wang | G08G 1/012 |
| 2017/0323249 | A1* | 11/2017 | Khasis | G01C 21/3461 |

OTHER PUBLICATIONS

The Jakarta Post, "Greater Jakarta: City, Waze partner on even-odd policy," (2017). Retrieved from the Internet on Mar. 14, 2018: URL:http://www.thejakartapost.com/news/2017/10/20/greater-jakarta-city-waze-partner-even-odd-policy.html.

Jakarta Globe, "Waze Adds Feature to Help Jakarta Drivers Comply With Odd-Even Traffic Policy," (2017). Retrieved from the Internet on Mar. 14, 2018: URL:http://www.jakartaglobe.beritasatu.com/business/waze-adds-feature-to-help-jakarta-drivers-comply-with-odd-even-traffic-policy/.

Berita Jakarta, "Waze Involved to Launch Even-Odd Navigation Feature," (2017). Retrieved from the Internet on Mar. 14, 2018: URL:http://www.beritajakarta.id/en/read/23765/Waze_Involved_to_Launch_Even-Odd_Navigation_Feature%20-%20.WqftPE2WyUk#.WqktyU2Wy70.

Tecnologia & Games, "In São Paulo, Waze will show alternative path outisde the rotation zone," (2015). Retrieved from the Internet on Mar. 14, 2018: URL:http://tecnologia.ig.com.br/2015-08-10/em-sao-paulo-waze-mostrara-caminho-alternativo-fora-da-zona-de-rodizio.html.

Exame, "Waze will help motorist avoid caseline fines," (2015). Retrieved from the Internet on Mar. 14, 2018: URL:https://exame.abril.com.br/tecnologia/waze-ajudara-motorista-a-evitar-multas-por-rodizio/.

Canal Tech, "Waze Launches New Feature to Help Drivers on Plate Caster Days," (2015). Retrieved from the Internet on Mar. 14, 2018: URL:https://canaltech.com.br/apps/waze-lanca-novo-recurso-para-ajudar-motoristas-em-dias-de-rodizio-46981/.

Olhar Digital, "Waze will remind users of caster and route routes that avoid forbidden routes," (2015). Retrieved from the Internet on Mar. 14, 2018: URL:https://olhardigital.com.br/noticia/waze-vai-lembrar-usuario-de-rodizio-e-tracar-rotas-que-evitem-vias-proibidas/50411.

G1, "Waze goes on to inform if the route includes street restricted by the carriage in São Paulo," (2015). Retrieved from the Internet on Mar. 14, 2018: URL:http://g1.globo.com/tecnologia/noticia/2015/08/waze-passa-informar-se-rota-inclui-rua-restrita-pelo-rodizio-em-sao-paulo.html.

IDG Now, "New feature of Waze helps SP driver dribble caster," (2015). Retrieved on the Internet on Mar. 14, 2018: URL:http://idgnow.com.br/mobilidade/2015/08/10/novo-recurso-do-waze-ajuda-motorista-de-sp-a-driblar-rodizio/.

Mobile Time, "Waze launches option for Paulista to escape the car caster," (2015). Retrieved from the Internet on Mar. 14, 2018: URL:http://www.mobiletime.com.br/10/08/2015/waze-lanca-opcao-para-paulistano-escapar-do-rodizio-de-automoveis/418564/news.aspx.

Boadica, "Waze will remember user of Rodízio and track routes that avoid prohibited roads," (2015). Retrieved from the Internet on Mar. 14, 2018: URL:https://www.boadica.com.br/noticia/107129/waze-vai-lembrar-usuario-de-rodizio-e-tracar-rotas-que-evitem-vias-proibidas.

Baguete, "SP: Waze to escape the caster," (2015). Retrieved from the Internet on Mar. 14, 2018: URL:https://www.baguete.com.br/noticias/11/08/2015/motorista-de-sp-escapa-do-rodizio-com-waze.

UOL, "Waze Unveils routing function and outlines alternative routes," (2015). Retrieved from the Internet on Mar. 14, 2018: URL:http://blogs.ne10.uol.com.br/mundobit/2015/08/11/waze-inaugura-funcao-que-avisa-sobre-rodizio-e-traca-rotas-alternativas/.

Facebook, "Now avoid the carvery of São Paulo using Waze!" (2015). Retrieved from the Internet on Mar. 14, 2018: URLhttps://www.facebook.com/WazeBr/photos/a.370375256364772.80383.359317787470519/915898881812404/?type=3&theater.

International Search Report and Written Opinion for Application No. PCT/US2018/065149, dated Apr. 17, 2019.

* cited by examiner

SYSTEMS AND METHODS FOR AVOIDING LOCATION-DEPENDENT DRIVING RESTRICTIONS

FIELD OF THE DISCLOSURE

The present disclosure generally relates to generating navigation directions to avoid areas having location-dependent driving restrictions.

BACKGROUND

Today, software applications executing in computers, smartphones, etc. or embedded devices generate step-by-step navigation directions. Typically, a user specifies the starting point and the destination, and a software application displays the directions immediately and/or as the user travels from the starting point and the destination. These navigation directions may be inaccurate, however, if they do not account for current conditions such as local road closures.

Recently, many environmentally-conscious cities around the world have implemented rules designed to reduce pollution by limiting the number of vehicles on the road. Each city has implemented these "green" driving restrictions in somewhat different ways. For instance, in some cities, vehicles may be restricted from particular roads based on, e.g., a vehicle license plate number. In particular, vehicles having even-numbered license plate numbers may drive on a given road on even-numbered dates, while vehicles having odd-numbered license plate numbers may drive on that road on odd-numbered dates. In other cities, only vehicles having particular permits are allowed to drive at peak rush time periods. In still other cities, certain types of vehicles are restricted from certain roads. Moreover, in some cities, restrictions may be added or removed on a day-to-day basis based on pollution levels each day.

SUMMARY

In one aspect, a computer-implemented method for generating navigation directions to avoid areas having location-dependent driving restrictions is provided. The method includes receiving, by an electronic device, a user request for navigation directions from an origin location to a destination location, determining, by a navigation application of the electronic device, one or more sets of navigation directions, each of which directs a user from the origin location to the destination location, and comparing, by the electronic device, one or more of: the origin location, the destination location, or the one or more sets of navigation directions to locations associated with a plurality of driving restrictions, each of the plurality of driving restrictions associated with a different set of rules, to identify a driving restriction of the plurality of driving restrictions that applies to the user request for navigation directions. The method also includes prompting, by the electronic device, the user of the electronic device to provide information related to the identified driving restriction, determining, by the electronic device, based on the information and the set of rules associated with the identified driving restriction, that the identified driving restriction applies to the user of the electronic device, and determining, by the electronic device, based on the information and the set of rules associated with the identified driving restriction, that the identified driving restriction applies to the user of the electronic device. The method also includes identifying, by the electronic device, a set of navigation directions of the one or more sets of navigation directions that avoids the locations associated with the identified driving restriction that applies to the user of the electronic device, and providing, by the electronic device, the identified set of navigation directions to the user of the electronic device to avoid the locations associated with the identified driving restriction.

In another aspect, an electronic device is provided for generating navigation directions to avoid areas having location-dependent driving restrictions, including one or more processors and a non-transitory computer-readable memory storing instructions thereon. The instructions, when executed by the one or more processors, cause the electronic server device to receive a user request for navigation directions from an origin location to a destination location; determine one or more sets of navigation directions, each of which directs a user from the origin location to the destination location; and compare one or more of: the origin location, the destination location, or the one or more sets of navigation directions to locations associated with a plurality of driving restrictions, each of the plurality of driving restrictions associated with a different set of rules, to identify a driving restriction of the plurality of driving restrictions that applies to the user request for navigation directions. Furthermore, the instructions further cause the electronic device to prompt the user of the electronic device to provide information related to the identified driving restriction; and determine, based on the information and the set of rules associated with the identified driving restriction, that the identified driving restriction applies to the user of the electronic device. Moreover, the instructions further cause the electronic device to identify a set of navigation directions of the one or more sets of navigation directions that avoids the locations associated with the identified driving restriction that applies to the user of the electronic device; and provide the identified set of navigation directions to the user of the electronic device to avoid the locations associated with the identified driving restriction.

In yet another aspect, a non-transitory computer medium stores instructions for generating navigation directions to avoid areas having location-dependent driving restrictions. When executed by one or more processors in a computing device, the instructions cause the one or more processors to receive a user request for navigation directions from an origin location to a destination location; determine one or more sets of navigation directions, each of which directs a user from the origin location to the destination location; and compare one or more of: the origin location, the destination location, or the one or more sets of navigation directions to locations associated with a plurality of driving restrictions, each of the plurality of driving restrictions associated with a different set of rules, to identify a driving restriction of the plurality of driving restrictions that applies to the user request for navigation directions. Furthermore, the instructions further cause the one or more processors to prompt the user to provide information related to the identified driving restriction; and determine, based on the information and the set of rules associated with the identified driving restriction, that the identified driving restriction applies to the user. Moreover, the instructions further cause the one or more processors to identify a set of navigation directions of the one or more sets of navigation directions that avoids the locations associated with the identified driving restriction that applies to the user; and provide the identified set of navigation directions to the user to avoid the locations associated with the identified driving restriction.

DETAILED DESCRIPTION

Overview

As discussed above, many environmentally-conscious cities around the world have implemented rules designed to reduce pollution by limiting the number of vehicles on the road, with each city implementing these "green" driving restrictions in different ways. While a driver may be generally aware of rules and restrictions in his or her own city, drivers often need to drive between and through different cities during a daily commute or when traveling.

The software system of this disclosure, operating in a network server and/or a navigation application, effectively controls traffic in an urban environment by identifying driving restrictions, identifying routes to which these restrictions apply, and directing drivers to follow navigation instructions that account for the restrictions. In this manner, the software system can reduce congestion and air pollution.

The systems and methods are provided for generating navigation directions configured to avoid areas having vehicle restrictions that apply to a particular driver (or user) and/or the particular driver's vehicle, even as the driver drives through cities having different restrictions. In particular, based on a user request for navigation directions from an origin location to a destination location, a navigation application of an electronic device may obtain multiple sets of navigation directions from the origin location to the destination location. By comparing the origin location, the destination location, or the one or more sets of navigation directions to locations associated with driving restrictions, the navigation application may identify whether driving restrictions apply to any of the segments along routes corresponding to each set of navigation directions.

Consequently, the navigation application may prompt the user to provide information related to driving restrictions for restricted areas that include the origin location, destination location, and/or locations along the route for navigating between the origin and destination. Based on the driver input information and the rules associated with each restriction (and/or other factors such as the day of the week, time of day, local holidays, etc.), the navigation application may determine whether each driving restriction applies to the driver and/or the vehicle. Accordingly, based on which restrictions apply to the driver and/or the vehicle, a set of restriction-based navigation directions may be identified and provided to the driver to avoid restricted locations.

Generally speaking, techniques for generating restriction-based navigation directions can be implemented in a navigation application executed on an electronic device, one or several network servers, or a system that includes a combination of these devices. However, for clarity, the examples below focus primarily on an embodiment in which a user requests navigation directions via a navigation application on an electronic device. The navigation application transmits the request to a navigation server which generates a set of navigation directions having several maneuvers. The navigation application and/or the navigation server may also communicate with a driving restriction server which identifies one or several driving restrictions associated with locations included in the navigation directions and provides indications of the driving restrictions and corresponding rules to the navigation application.

In some embodiments, the driving restriction server may transmit a request to the navigation server to generate an alternative set of navigation directions for providing an alternative route to avoid restricted areas. In other embodiments, the navigation server provides several sets of navigation directions to the navigation application for the user to select one of the sets of navigation directions. The navigation application also presents indications of the driving restrictions and the restricted areas, so that the user may select a set of navigation directions that does not include restricted areas or includes areas where the corresponding restriction does not apply to the user. For example, the restriction may not apply on holidays or after a particular time, the user may have a permit to drive in the restricted area, or the user may have a license plate number which is permitted for the particular day in the restricted area.

In any event, in response to receiving a selection of one of the sets of navigation directions, the navigation application presents an indication of the selected set of navigation directions on a map display of the electronic device along with indications of driving restrictions and restricted areas. The indications of driving restrictions may include a warning notifying the user of the driving restriction, and user controls for providing information related to the driving restriction, such as the license plate number of the user's vehicle.

Example Computing Environment

Figure 1:
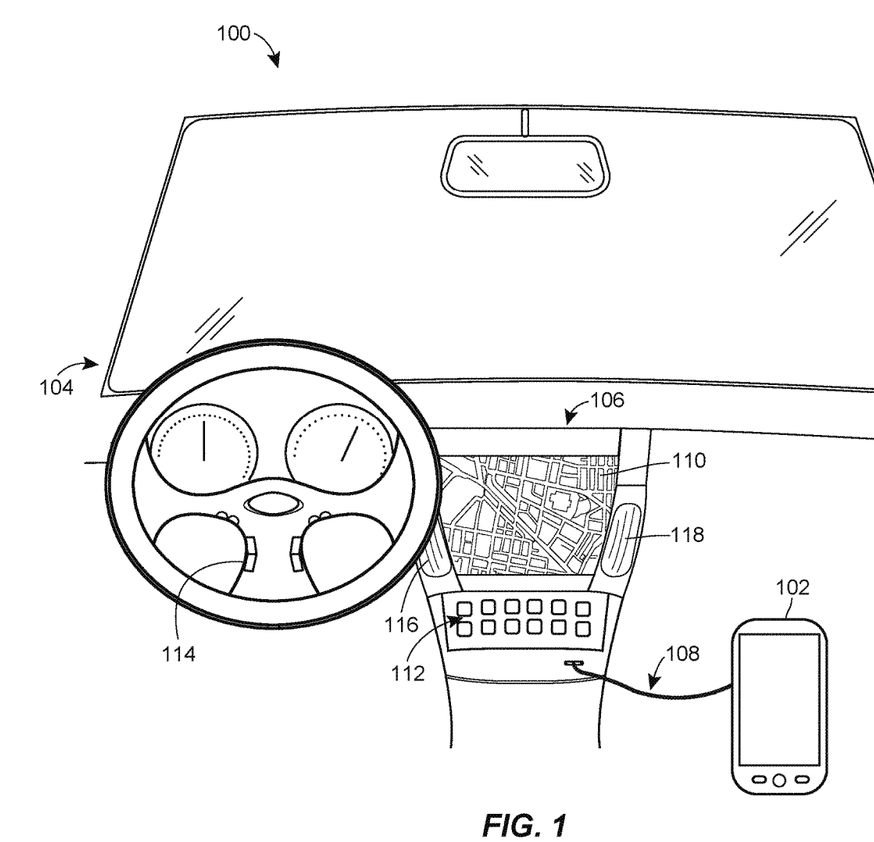
FIG. 1 illustrates an example environment in which the techniques of the present disclosure can be used for generating restriction-based navigation directions to avoid areas having location-dependent driving restrictions.

Referring to FIG. 1, an example environment 100 in which the techniques outlined above can be implemented for generating restriction-based navigation directions includes an electronic device 102 and a vehicle 104 with a head unit 106. The electronic device 102 may be a smart phone, tablet computer, wearable computer, etc. The electronic device 102 communicates with the head unit 106 of the vehicle 104 via a communication link 108, which may be wired (e.g., Universal Serial Bus (USB)) or wireless (e.g., Bluetooth, Wi-Fi Direct). The electronic device 102 also can communicate with various content providers, servers, etc. via a wireless communication network.

In operation, the electronic device 102 obtains navigation data to navigate the user from an origin location to a destination location in the form of a sequence of navigation instructions or maneuvers. As discussed in more detail below, the electronic device 102 can receive navigation data via a communication network from a navigation service or can generate navigation data locally, depending on the implementation. In some implementations, the electronic device 102 provides the head unit 106 with information related to navigation, which may include digital map images, text, and audio. The head unit 106 displays this information via a display 110. The display 110 in some implementations is a touchscreen and includes a software keyboard for entering text input, which may include the name or address of a destination, point of origin, etc. Another type of the display 110 can be a screen provided along with a non-touch input device, such as a rotary controller, for example, or a separate touch pad. In general, the display 110 need not be capable of displaying both text and images. A head unit in another vehicle can include, for example, a simple display only capable of displaying alphanumeric characters on one or several lines.

The head unit 106 can include hardware input controls such as buttons, knobs, etc. These controls can be disposed on the head unit 106 or elsewhere in the vehicle 104. For example, the vehicle 104 in FIG. 1 includes navigation controls 112 on the head unit 106 as well as steering wheel controls 114 communicatively coupled to the head unit 106. The controls 112 and 114 can be mapped to a variety of navigation control functions on the electronic device 102. The controls 112 and 114 in some implementations also can be used for entering alphanumeric characters or to perform other functions for requesting navigation directions.

The vehicle 104 can also include audio input and output components, such as a microphone 116 and a speaker 118. The microphone 116 may be configured to capture voice input from a user, while the speaker 118 may be configured to communicate navigation-related information with the user. Similar to the hardware controls 112 and 114, the microphone 116 and speaker 118 can be disposed directly on the head unit 106 or elsewhere in the vehicle 104.

An example implementation of the electronic device 102 is illustrated with reference to FIG. 2. The electronic device 102 may include one or more processors 120 coupled to a memory 122, a GPS unit 124, a display 126 such as a touchscreen, one or more sensors 128 (e.g., an accelerometer, a gyroscope, an inertial measurement unit (IMU), a speedometer), one or more audio input components 130, one or more audio output components 132, and one or more communication units 134. The communication units 134 may include a short range communication unit for communicating with the head unit 106, as well as a long range communication unit. The short range communication unit may support one or more communication schemes such as USB, Bluetooth, Wi-Fi Direct, etc., while the long range communication unit may transmit and receive data via a suitable wireless network 136, such as, e.g., a 3G cellular network or a 4G cellular network. Each of the one or more processors 120 can be any suitable general-purpose processing unit (e.g., a CPU), a microprocessor, or an application-specific processing unit. The memory 122 can be a non-transitory computer-readable medium that can include persistent components such as a hard disk, a flash drive, etc. and non-persistent components such as a random access memory (RAM) unit. The processor(s) 120 and the memory 122 can be interconnected via a suitable electrical connection such as a digital bus, for example.

Using the communication units 134, the electronic device 102 may communicate with any number of suitable servers. In the example configuration of FIG. 2, the electronic device 102 communicates with a navigation server 138 that provides navigation data, as well as a driving restriction server 140. The navigation server 138 may include a processor 142 and a memory 144, and may be configured to access a navigation database 146 storing navigation data and/or a map database storing map data. The driving restriction server 140 may include a processor 148 and a memory 150, and may be configured to access a driving restriction database 152 storing driving restriction data. The driving restriction data may include a listing of various driving restrictions, rules associated with each driving restriction, locations associated with each driving restriction, etc. For example, the various driving restrictions may include a license plate restriction, a permit restriction, a vehicle type restriction, a vehicle age restriction, an air pollution restriction, or any other suitable driving restriction.

The rules associated with a license plate restriction may include for example, a restricted area and license plate numbers for vehicles that are not permitted to drive in the restricted area. The rules may also include days of the week and/or times on which vehicles having the identified license plate numbers are prohibited from driving in the restricted area. More specifically, vehicles with license plate numbers that end in an even number may drive on Monday, Wednesday, and Friday nights while vehicle with license plate numbers that end in an odd number may drive on Tuesday, Thursday, and Friday mornings. The rules associated with a license plate restriction may also include exceptions to the general rule such as that driving is permitted on weekends or holidays, during emergency situations, etc.

The rules associated with a permit restriction may include for example, restricted areas and different types of permits for each restricted area, such that a vehicle must have a permit designated for a particular restricted area. The rules may also include days of the week and/or times on which vehicles without a permit are prohibited from driving in the particular restricted area. The rules associated with a permit restriction may also include exceptions to the general rule such as that driving is permitted on weekends or holidays, during emergency situations, etc.

The rules associated with a vehicle type restriction may include for example, a restricted area and the types of vehicles that are not permitted to drive in the restricted area. The rules may also include days of the week and/or times on which the designated vehicle types are prohibited from driving in the restricted area. More specifically, sport utility vehicles (SUVs) and trucks may be prohibited within the restricted area on weekdays between 8 a.m. and 8 p.m. The rules associated with a vehicle type restriction may also include exceptions to the general rule such as that driving is permitted during emergency situations, etc.

The rules associated with a vehicle age restriction may include for example, a restricted area and a threshold age/date where vehicles manufactured before the threshold date are prohibited from driving in the restricted area. The rules may also include days of the week and/or times on which the designated vehicles are prohibited from driving in the restricted area. More specifically, vehicles made more than ten years ago may be prohibited within the restricted area from 10 a.m. to 6 p.m. The rules associated with a vehicle age restriction may also include exceptions to the general rule such as that driving is permitted during emergency situations, etc.

The rules associated with an air pollution restriction may include for example, a restricted area and a threshold air pollution level, where vehicles are prohibited from driving in the restricted area when the air pollution level is above the threshold air pollution level. The rules may also include days of the week and/or times on which vehicles are prohibited from driving in the restricted area. Still further, in some scenarios the rules associated with the air pollution restriction may include a first restricted area (e.g., a neighborhood in Paris, France) and a second restricted area which surrounds the first restricted area and is larger than the first restricted area (e.g., Paris). The rules may indicate that when the air pollution level in the second restricted area is below a threshold air pollution level, vehicles manufactured before a threshold date or having a pollution metric (e.g., based on fuel emissions) above a pollution threshold may be prohibited from driving in the first restricted area on weekdays between 8 a.m. and 8 p.m. When the air pollution level in the second restricted area is at or above the threshold air pollution level, vehicles manufactured before a threshold date or having a pollution metric above a pollution threshold may be prohibited from driving in the second restricted area. Vehicles manufactured after the threshold date and having a pollution metric below the pollution threshold may also be required to have a permit to drive in the first restricted area. The rules associated with an air pollution restriction may also include exceptions to the general rule such as that driving is permitted during emergency situations, etc.

Moreover, some of the rules may be obtained and/or updated from crowd-sourced data provided by electronic device users executing the navigation application. For example, a user may indicate using the navigation application, that in a particular restricted area, a corresponding license plate restriction has been lifted for the day due to a local holiday. The navigation application 154 may then transmit the rule to the driving restriction server 140.

The driving restrictions mentioned above and rules associated with each driving restrictions are merely a few exemplary driving restrictions and exemplary rules. The driving restriction server 140 may also obtain additional or alternative driving restrictions and additional or alternative rules associated with each driving restriction. Furthermore, each driving restriction may include any suitable combination of rules and the rules mentioned above for one type driving restriction may be included in another type of driving restriction. For example, the air pollution restriction may include vehicle age rules, vehicle type rules, and vehicle permit rules.

Figure 2:
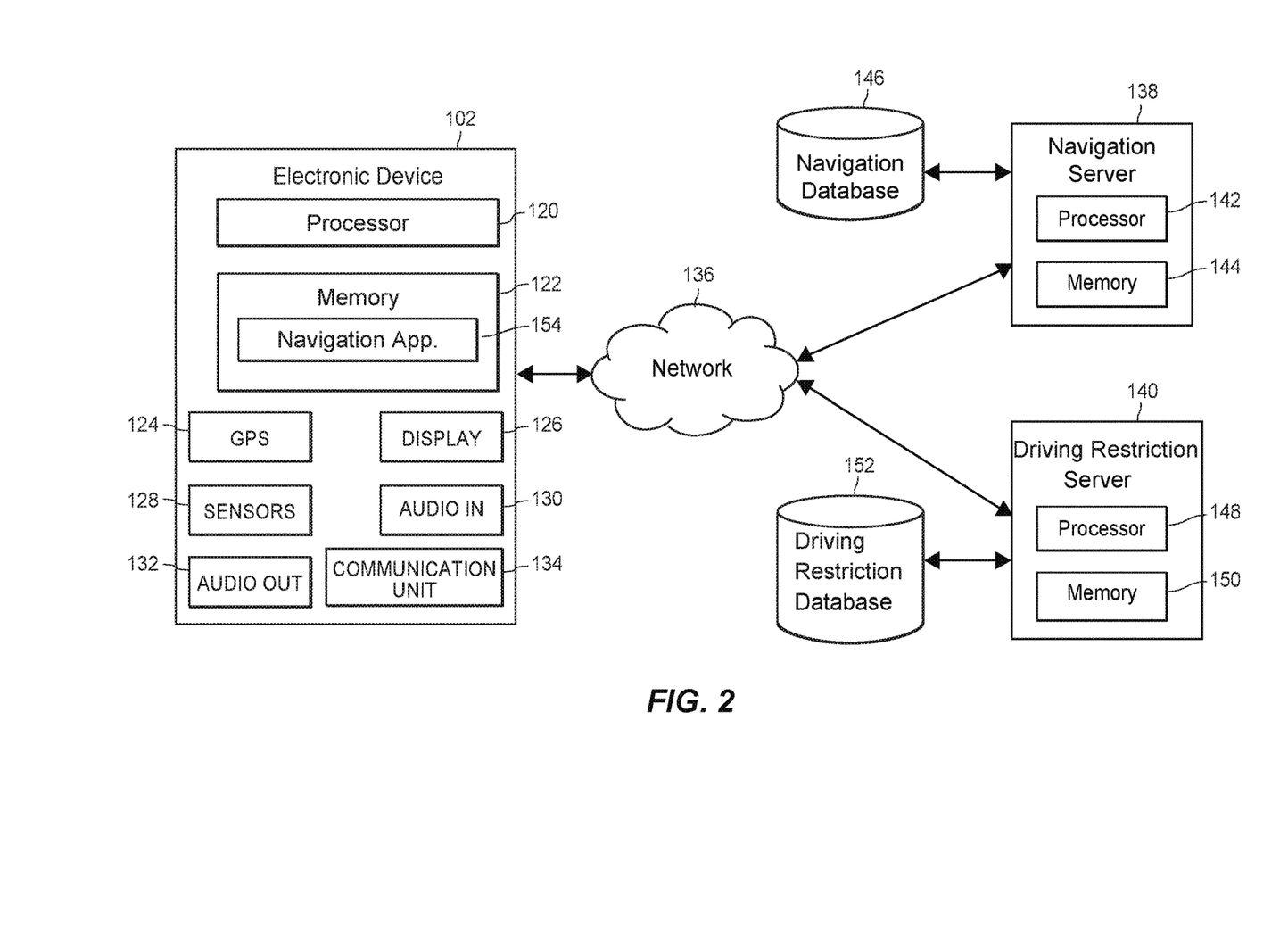
FIG. 2 is a block diagram of an example electronic device that can operate in the system of FIG. 1.

As illustrated in FIG. 2, the memory 122 of the electronic device 102 stores a navigation application 154. The navigation application 154 can include compiled instructions and/or instructions in any suitable programmable language interpretable at runtime, and executable on the one or more processors 120. Generally, the navigation application 154 generates a digital map or map display using vector graphic data, raster tiles, or map data in any other suitable format for display on the user interface 126. The navigation application 154 also generates, or receives from the navigation server 138, navigation directions directing a user (e.g., driver) from the current location or another origin location to a destination that the user has selected. An indication of a route following the navigation directions may be presented on the map display. In some embodiments, the navigation application 154 generates, or receives from the navigation server 138, multiple sets of navigation directions, each directing the user from the origin location to the destination location on a different route. In this manner, the user is provided with several routes to choose from.

More specifically, the navigation application 154 identifies one or more sets of restriction-based navigation directions from the origin location to the destination location that avoid areas having location-dependent driving restrictions. For example, the navigation application 154 may access driving restriction data from the driving restriction database 152 or driving restriction server 140, and compare the driving restriction data to potential routes directing the user from the origin location to the destination location. Additionally, the navigation application 154 may request information from the user in order to determine whether the driving restrictions apply to the user. Accordingly, the navigation application 154 may identify a set of navigation directions that avoids areas having driving restrictions that apply to the user, and provide the identified set of navigation directions to the user.

In other embodiments, the navigation server 138 provides several sets of navigation directions to the user, each directing the user from the origin location to the destination location on a different route. The navigation server 138 may generate each set of navigation directions and rank or score the routes following each set of navigation directions according to shortest distance, shortest duration, etc. The navigation server 138 may also receive driving restriction data from the driving restriction server 140 and adjust the rankings based on the routes having segments associated with driving restrictions. For example, routes having segments associated with driving restrictions may be lowered in the rankings and routes which do not have segments associated with driving restrictions may be boosted. The navigation server 138 may then provide routes ranked above a threshold ranking (e.g., the top three highest ranking routes) to the navigation application 154. In some embodiments, information received from the user that is related to the identified driving restriction may be provided to the navigation server 138 to update the order in which the routes are ranked. For example, when a permit restriction does not apply to the user because the user has the required permit, the navigation server 138 may boost a route having a segment associated with the permit restriction in the rankings.

The driving restriction server 140 also provides driving restriction data to the navigation application 154 for driving restrictions which apply to one or more segments of each of the routes. Accordingly, the navigation application 154 may present an indication of each driving restriction with the corresponding route segment on the map display. For example, segments associated with driving restrictions may be highlighted on the map display, rendered in a different color, line style, or shading, presented with a corresponding notification, or indicated in any other suitable manner. The map display may include user controls for selecting one of the sets of navigation directions, for example by touch-selecting one of the routes on the map display, by swiping left, right, up, or down to toggle between routes, and/or by selecting a "Start" button to begin receiving navigation directions for a selected route.

In any event, when a route is selected that includes a segment within the restricted area for a driving restriction, the navigation application 154 may present a prompt or user control for providing information related to the identified driving restriction. For example, if the driving restriction includes a rule requiring a permit, the user may be prompted to enter a permit number to confirm whether or not the user has the required permit. As another example, if the driving restriction includes a rule associated with the license plate number of the vehicle, the user may be prompted to provide the license plate number. As still another example, if the driving restriction includes a rule related to the type of vehicle, the user may be prompted to enter the vehicle type. The prompt or user control may include a text field for entering a permit number, license plate number, vehicle information, etc., may include a drop-down menu for selecting a type of permit, type of vehicle, or may include any other suitable control for providing information related to the driving restriction.

Example User Interfaces Presented by the Navigation Application

FIGS. 3A-3D illustrate example user interfaces 300-390 for presenting restriction-based navigation directions on a map display via a navigation application executing on an electronic device, in accordance with the systems and methods disclosed herein.

Figure 3A:
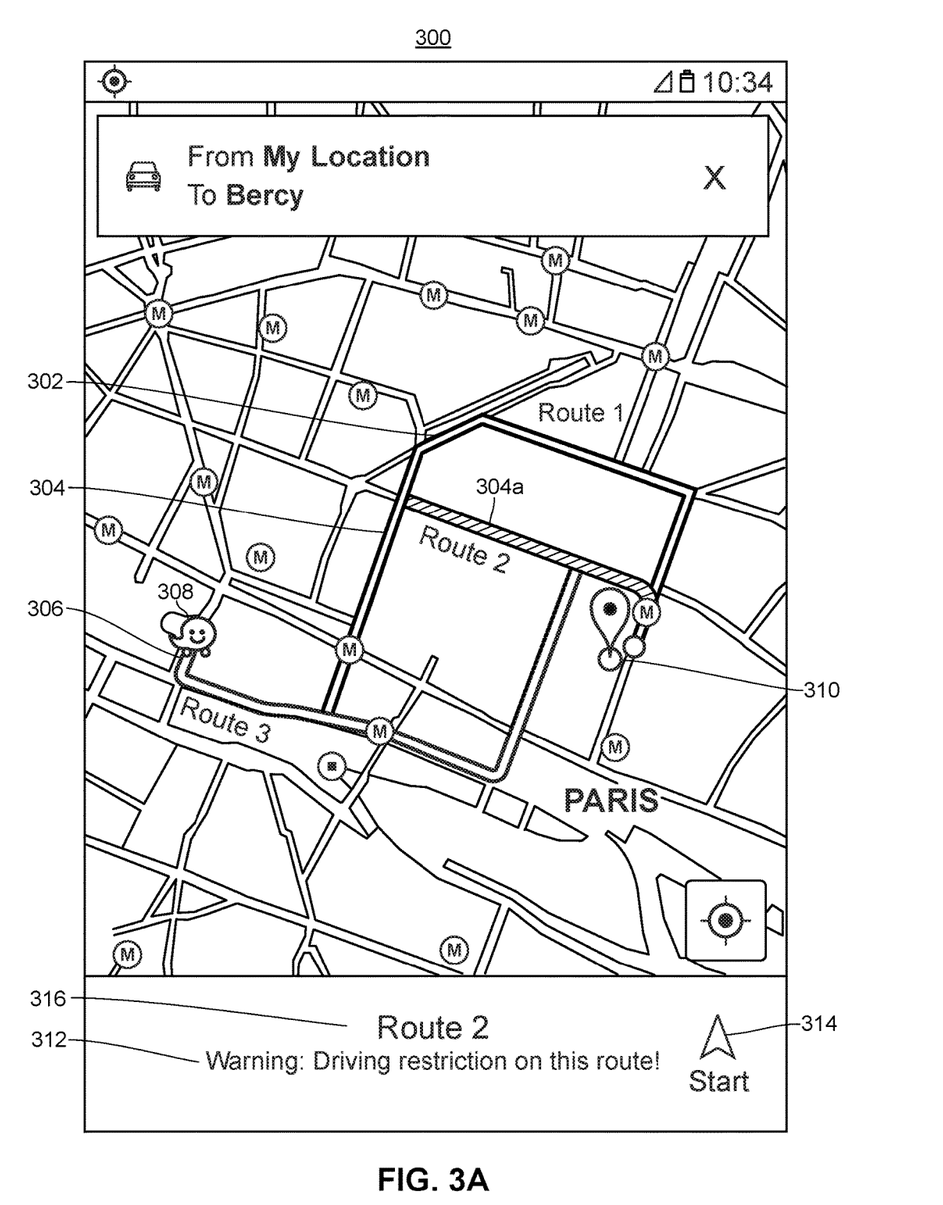
FIGS. 3A-3D illustrate example user interfaces for displaying restriction-based navigation directions to a user via a navigation application executing on an electronic device.

In the example map display 300 shown in FIG. 3A, the navigation application 154 presents three sets of navigation directions (Route 1 (ref. no. 302), Route 2 (ref. no. 304), and Route 3 (ref. no. 306)), where each set directs a user from the same origin location 308 to the same destination location 310. In some embodiments, the map display 300 may include user controls for selecting one of the routes. For example, the user may touch-select one of Route 1 (ref. no. 302), Route 2 (ref. no. 304), and Route 3 (ref. no. 306) to receive navigation directions for the selected route. In another example, the user may toggle the banner 312 by swiping left or right to select the route 316 indicated in the banner 312 and may select the "Start" button 314 to begin navigating along the selected route. Also as shown in FIG. 3A, there is a driving restriction associated with a segment 304a included in Route 2. The segment 304a associated with a driving restriction may be highlighted on the map display 300, rendered in a different color, line style, or shading, presented with a corresponding notification, or indicated in any other suitable manner. Moreover, the banner 312 may include a warning 316 when presented Route 2 as the selected route. The warning 316 may be "Warning: Driving restriction on this route!" and may include an indication of the type of driving restriction such as a license plate restriction or permit restriction, may include an indication on the map display 300 of the boundaries of the restricted area for the driving restriction, or may include indications of the rules associated with the driving restriction, such as "Vehicles with odd license plate numbers are permitted on Mondays, Wednesdays, and Fridays between 8 a.m. and 8 p.m."

Figure 3B:
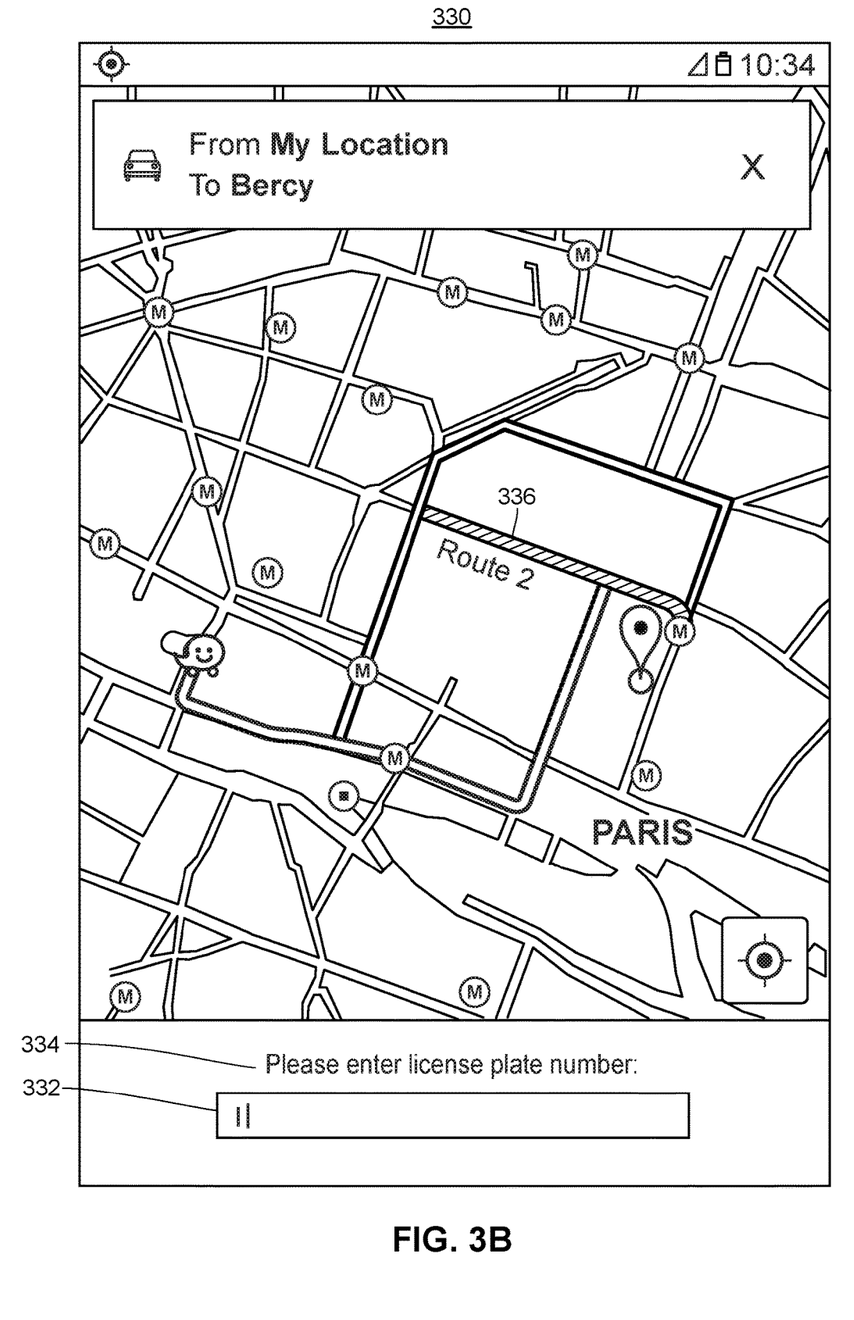

In response to receiving a selection of Route 2 by the user, the navigation application 154 presents the example map display 330 as shown in FIG. 3B. In the example map display 330, the banner 332 includes a prompt 334 for the user to provide information related to the identified driving restriction associated with Route 2. In particular, the user is prompted to provide the license plate number of the user's vehicle. For example, the driving restriction may restrict vehicles with license plate numbers ending in an even digit from the identified segment 336 of Route 2. In other embodiments, the user control 334 may receive and analyze images to identify a license plate number within an image of the license plate. For example, the user may capture an image of the license plate via a camera on the electronic device 102.

Figure 3C:
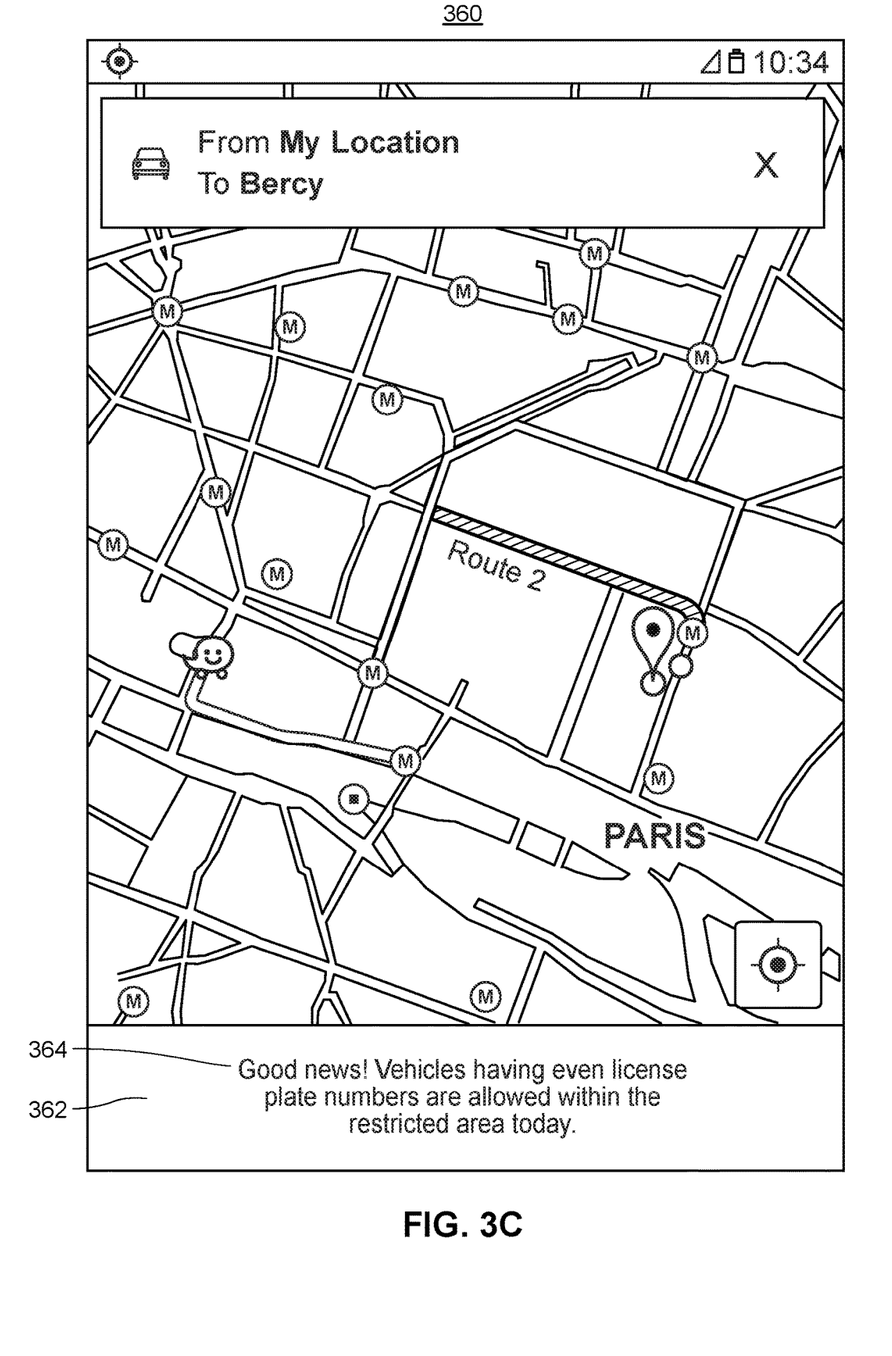

In one exemplary scenario, as shown in the map display 360 in FIG. 3C, the user enters a license plate number ending in an even digit in response to the prompt 334 in the map display 330 of FIG. 3B. The navigation application 154 may then provide the license plate number to the driving restriction server 140 which applies the license plate number to the rules for the license plate restriction within the restricted area to determine whether the vehicle is permitted in the restricted area. In other embodiments, the navigation application 154 applies the license plate number to the rules for the license plate restriction (received from the driving restriction server 140 as driving restriction data) to determine whether the vehicle is permitted in the restricted area. In this scenario, the navigation application 154 or the driving restriction server 140 determines that the user is permitted to drive on Route 2, and the set of navigation directions corresponding to Route 2 may be presented on the map display 360 via the navigation application 154. The banner 362 in the map display 360 may include a notification 364 that the user's vehicle is permitted within the restricted area included in Route 2. In some embodiments, the banner 362 may also include indications of the rules associated with the driving restriction or the boundaries of the restricted area.

In other instances (not shown), based on factors such as duration or distance, Route 1 or Route 3 may be selected and the set of navigation directions corresponding to Route 1 or Route 3 may be presented on the map display 360 via the navigation application 154. For example, the navigation server 138 may rank Route 1 or Route 3 above Route 2 when ranking or scoring the routes according to distance, duration, or any other suitable factor.

Figure 3D:
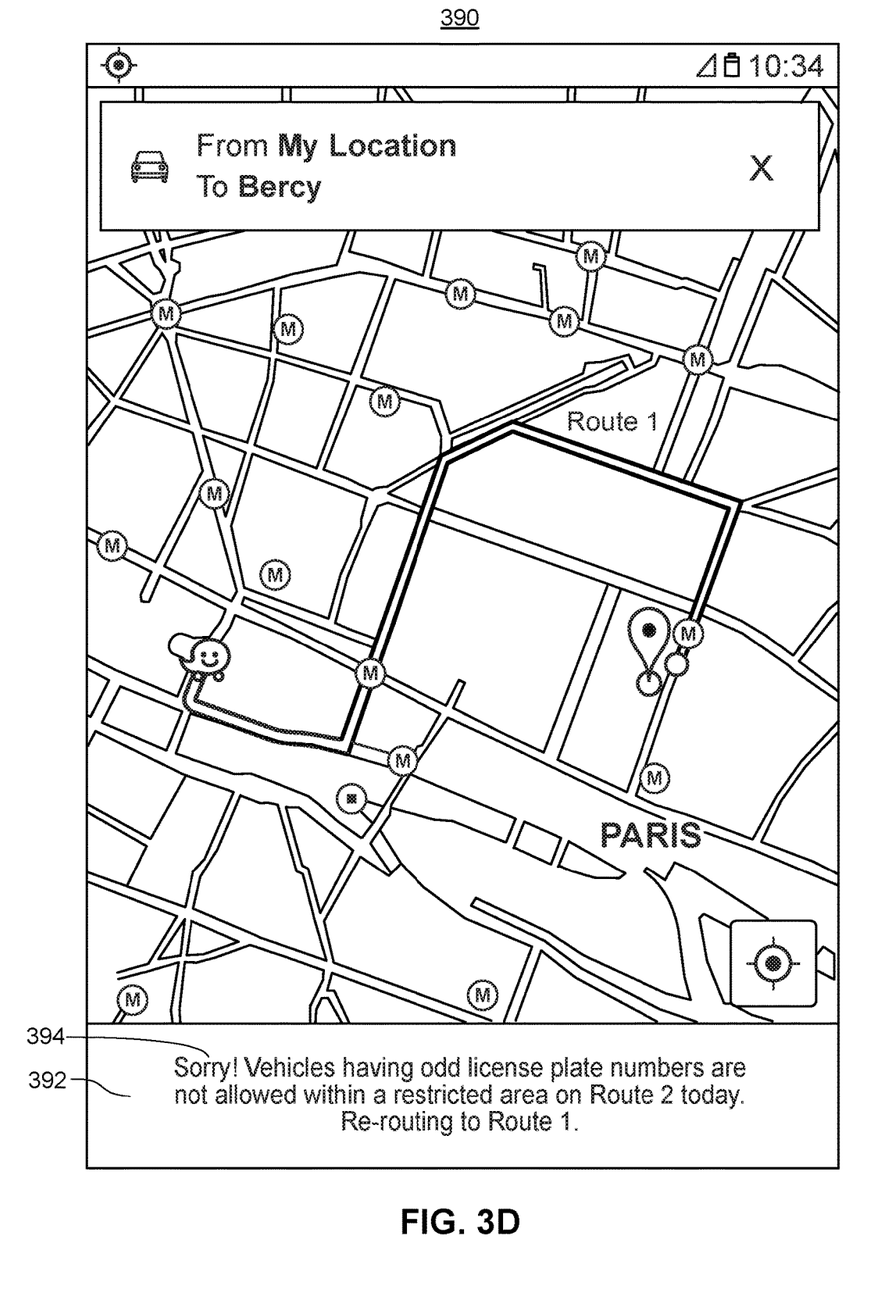

In another exemplary scenario, as shown in the map display 390 in FIG. 3D, the user enters a license plate number ending in an odd digit in response to the prompt 334 in the map display 330 of FIG. 3B. Consequently, the navigation application 154 or the driving restriction server 140 determines that the user is not permitted to drive on Route 2, while Routes 1 and 3 do not include restricted areas. As shown in FIG. 3D, for example, the set of navigation directions corresponding to Route 1 may be presented on the map display 390 via the navigation application 154. The banner 392 in the map display 390 may include a notification 394 that the user's vehicle is not permitted within the restricted area that is included in Route 2 and that the vehicle is being re-routed to Route 1. In some embodiments, the banner 392 may also include indications of the rules associated with the driving restriction or the boundaries of the restricted area. In some embodiments, the map display 390 may include user controls for overriding the determination to re-route the vehicle, such that the user may continue to receive navigation directions corresponding to Route 2. For example, the user may toggle the banner 392 by swiping left or right to select Route 2 or Route 3. When Route 2 is selected, the navigation application 154 may provide an additional notification, such as a pop-up message that the selected route includes a restricted area.

In other instances (not shown), based on factors such as duration or distance, Route 3 may be selected and the set of navigation directions corresponding to Route 3 may be presented on the map display 390 via the navigation application 154. For example, the navigation server 138 may rank Route 3 above Route 1 when ranking or scoring the routes according to distance, duration, or any other suitable factor.

Figure 4:
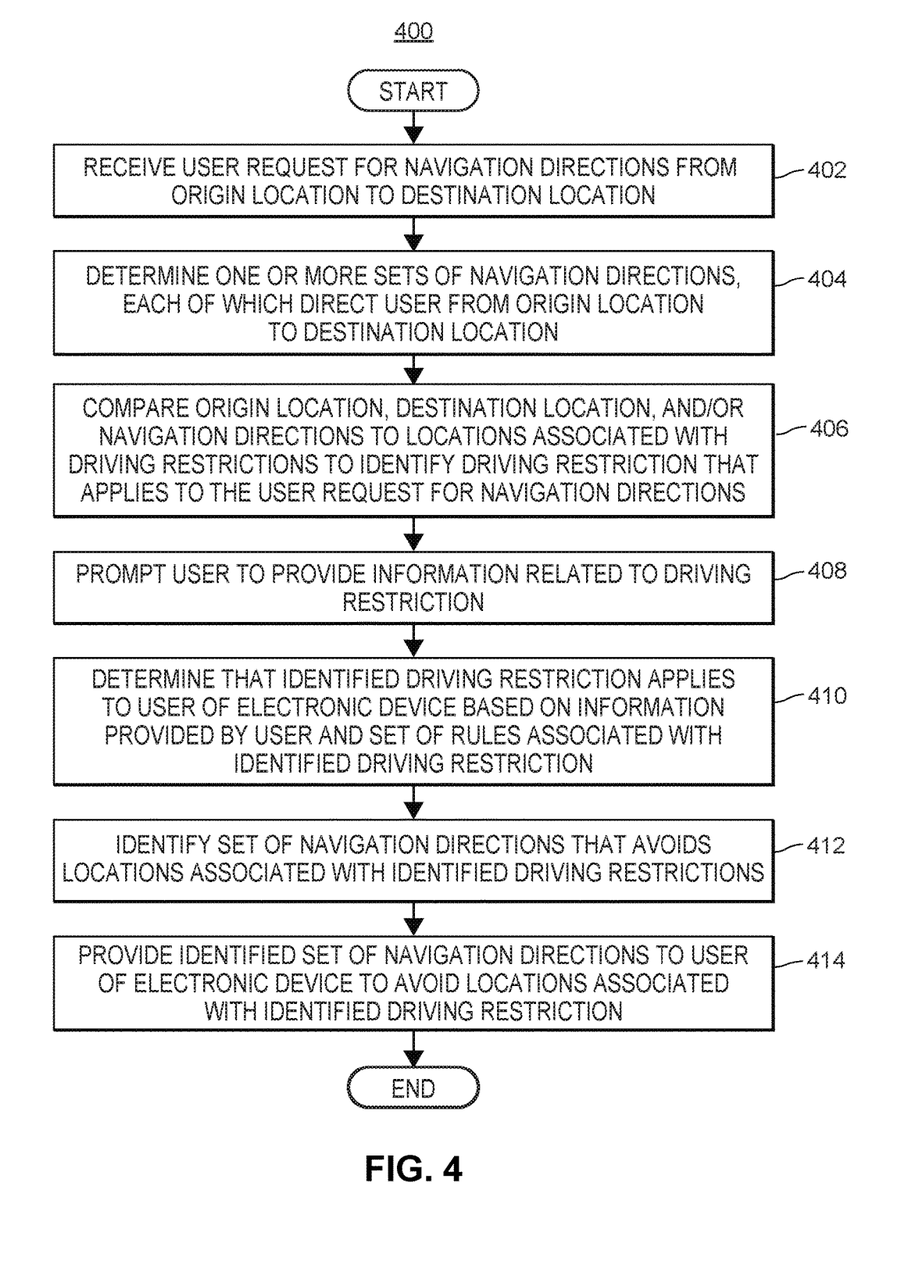
FIG. 4 is a flow diagram of an example method for generating restriction-based navigation directions to avoid areas having location-dependent driving restrictions.

Now referring to FIG. 4, an example method 400 for generating restriction-based navigation directions to avoid location-dependent driving restrictions may be implemented by a navigation application 154. In some embodiments, the method 400 can be implemented as a set of instructions stored on a computer-readable memory 122 and executable on one or more processors 120 of the electronic device 102. In other embodiments, the method 400 may be implemented as a set of instructions stored on a computer-readable memory 150 and executable on one or more processors 148 of the driving restriction server 140, a combination of the electronic device 102, the driving restriction server 140, and/or the navigation server 138, or another suitable computing system.

At block 402, a user request for navigation directions is received from an origin location to a destination location. The origin location may be the current location of the user.

At block 404, one or more sets of navigation directions may be determined, where each set of navigation directions direct a user of an electronic device from the origin location to the destination location. For example, the navigation application 154 may provide the request for navigation directions to the navigation server 138 which may in turn, provide sets of navigation directions to the destination location. In some embodiments, the navigation server 138 may rank several routes each corresponding to a different set of navigation directions and provide routes ranked above a threshold ranking. In another example, the navigation application 154 may generate the navigation directions based on offline or cached map and navigation data stored on the electronic device 102.

Each of the sets of navigation directions may include a different set of maneuvers for directing the user from the origin location to the destination location. For example, one set of navigation directions may direct the user to turn right on Main Street from the origin location, then turn left on First Street, then turn right on Sixth Street to reach the destination location. Another set of navigation directions may direct the user to turn right on Main Street from the origin location, then turn left on Third Street, then turn right on Fourth Street, then turn left on Fifth Street, then turn right on Sixth Street to reach the destination location. A further set of navigation directions may direct the user to turn left on Main Street from the origin location, turn right on Town Street, then turn right on Sixth Street to reach the destination location. Of course, there may be any number of suitable routes for the user to travel from origin location to the destination location.

At block 406, the origin location, the destination location, and/or the locations along a route corresponding to a set of navigation directions may be compared to locations associated with driving restrictions (a restricted area) in order to identify driving restrictions that apply to the user's request for navigation directions. For example, a particular street may be a location associated with a driving restriction. For instance, Main Street may be associated with a driving restriction, but First Street might not be associated with a driving restriction, or may be associated with a different driving restriction than Main Street. As another example, a particular region (e.g., a neighborhood, town, city, county, state, country, etc.) may be associated with a driving restriction. For example, the United States may have one type of driving restriction, while neighboring Canada has a different type of driving restriction (or no driving restrictions). Accordingly, the comparison may include comparing the streets and/or regions along a route corresponding to each set of navigation directions with data indicating restricted areas for enforcing driving restrictions.

The locations associated with the driving restrictions or restricted areas may be accessed via a database, such as, e.g., the driving restriction database 152. For example, the navigation application 154 may receive the restricted areas from the driving restriction server 140 and compare the restricted areas to the origin location, the destination location, and the locations along each route corresponding to each set of navigation directions for travelling from the origin location to the destination location. In another example, the navigation server 138 or the driving restriction server 140 may receive the restricted areas and compare the restricted areas to the origin location, the destination location, and the locations along each route corresponding to each set of navigation directions for travelling from the origin location to the destination location.

Moreover, the locations associated with the driving restrictions may be updated based on input received from other users. For instance, a user may notice that a local driving restriction has been temporarily removed or changed, and may provide input indicating the update or change via, e.g., a navigation application 154 on an electronic device 102 in communication with the driving restriction server 140 and/or the driving restriction database 152. The input may in turn be used to modify the data stored in the driving restriction database 152 or the memory 150 of the driving restriction server 140. For example, a local driving restriction may be lifted due to a local holiday or celebration. A user noticing that the local driving restriction has been lifted may input this information into the electronic device 102, and the local driving restriction information may in turn be propagated to navigation directions provided to additional users.

Typically, each driving restriction is associated with a different set of rules. As one example, a rule may restrict vehicles from one or more locations based on current air pollution levels in those locations. For instance, when the air pollution reaches a certain level, no vehicles are allowed on certain streets from 8 a.m. to 6 p.m. As another example, a rule may restrict a vehicle from one or more locations based on whether the user and/or the vehicle has a permit associated with each location. For instance, a permit may be required to drive on certain streets, or to drive at certain times. As still another example, a rule may restrict a vehicle from one or more locations based on a license plate number associated with the vehicle. For instance, vehicles having license plate numbers that end in an even digit may be restricted from driving on even dates, while vehicles having license plate numbers that end in an odd digit may be restricted from driving on odd dates, or vice versa. Additionally, as another example, a rule may restrict a vehicle from one or more locations based on the type of the vehicle or the age of the vehicle. For instance, only government vehicles may be allowed to drive in certain locations and/or at certain times. As another example, only public transportation vehicles may be allowed to drive in certain locations and/or at certain times. As still another example, certain makes and/or models of cars known to produce greater emissions may not be allowed to drive in certain locations or at certain times. Additionally or alternatively, cars manufactured before a certain date (e.g., a date related to emissions compliance standards taking effect) may not be allowed to drive in certain locations or at certain times. A given driving restriction may be associated with any number of rules, or any combination of rules.

In some instances, the origin location may be associated with one driving restriction with one set of rules, while the destination location is associated with another driving restriction with a different set of rules. For example, a user may request directions from Point A, an address in Illinois, a state which has one driving restriction, to Point B, an address in Indiana, which has a different driving restriction. Additionally or alternatively, some portion of the navigation directions may be associated with a different driving restriction with a different set of rules. For example, a user may request directions from Point A, an address in Illinois, to Point B, an address in Michigan, and the driving directions may include driving through Michigan, which may have different driving restrictions than either Illinois or Indiana.

In some instances, a warning may be provided to the user when a driving restriction applies to the current location of the user, the user's origin location, the user's destination location, and/or locations along a route corresponding to one or more sets of navigation directions. For example, a user may receive a warning as the user's vehicle crosses a border from a region with one driving restriction to a region with another driving restriction.

At block 408, the user may be prompted to provide information related to any identified driving restrictions. For example, if a driving restriction associated with one of the sets of navigation directions includes a rule requiring a permit, the user may be prompted to confirm whether or not the user has the required permit. As another example, if a driving restriction associated with one of the sets of navigation directions includes a rule associated with the license plate number of the vehicle, the user may be prompted to provide the license plate number. As still another example, if a driving restriction associated with one of the sets of navigation directions includes a rule related to the type of vehicle, the user may be prompted to provide information about the user's vehicle. As an additional example, if a driving restriction associated with of the sets of navigation directions includes a rule related to a time when the vehicle will be in a particular location, the user may be prompted to provide a target departure time or arrival time.

At block 410, based on the set(s) of rules associated with any identified driving restrictions that apply to the locations associated with the user's request for navigation directions, and based on information provided by the user, a determination may be made as to whether any identified driving restrictions apply to the user. Accordingly, the navigation directions may be customized for a particular user based on identified driving restrictions that apply to that particular user.

For example, if a first user provides information indicating that the first user does not have a required permit for driving in a particular location, the navigation application 154 may determine that a driving restriction for that particular location applies to the first user. On the other hand, if a second user provides information indicating that the second user has the required permit for driving in the location, the navigation application 154 may determine that the driving restriction for that particular location does not apply to the second user. Similarly, if a first user provides information indicating that the first user's license plate number ends in an even number, and a driving restriction for a particular location prohibits drivers with license plate numbers ending in even numbers, then the navigation application 154 may determine that the driving restriction applies to the first user. However, if a second user provides information indicating that the second user's license plate number ends in an odd number, then the navigation application 154 may determine that the same driving restriction does not apply to the second user. As another example, if a first user provides information indicating that the first user drives a high-emission vehicle that is subject to a driving restriction in a particular location, the navigation application 154 may determine that the driving restriction for that particular location applies to the first user. However, if a second user provides information indicating that the second user drives a lower-emission vehicle that is not subject to a driving restriction in the particular location, the navigation application 154 may determine that the driving restriction for that particular location does not apply to the second user.

The determination of whether a driving restriction applies to a particular user may additionally be based on the date and/or time that the user will be in the location associated with the identified driving restriction. For example, some restrictions include rules that prohibit certain drivers from driving on particular days or at particular times (e.g., high emissions vehicles cannot drive in a particular location during rush hour, vehicles having a certain license plate number can only drive on Mondays and Wednesdays, etc.). The date and/or time that the user will be in the location associated with the identified driving restriction may be determined based on information provided by the user, as discussed above (e.g., the user may provide an intended starting time and/or arrival time for the navigation directions). Additionally or alternatively, the date or time that the user will be in the location associated with the identified driving restriction may be determined based on when the user requests navigation directions. For example, when a request for navigation directions is made at 9:00 a.m., the starting time at the origin location may be assumed to be 9:00 a.m., and the user's subsequent times at each street and at the destination location may be determined based on the starting time.

In some instances, a warning may be provided to the user when any of the identified driving restrictions apply to the user. For example, based on the GPS location of the electronic device, the warning may notify the user that he or she is entering a location associated with a driving restriction. For instance, a text notification or audible notification may notify the user: "Warning: Entering License-Plate Restricted Zone. You may be subject to a fine if you proceed." Furthermore, the navigation application 154 may present a selectable user control on the map display for re-routing the user to avoid the identified driving restriction and any attendant fines.

At block 412, at least one set of navigation directions (of the one or more sets of navigation directions determined at block 404) may be identified as a restriction-based set of navigation directions that avoids the locations associated with any identified driving restrictions that apply to the user. In some embodiments, the one or more sets of navigation directions may be compared against the identified driving restrictions. Sets of navigation directions that include locations associated with identified driving restrictions that apply to the user may be filtered out. Accordingly, sets of navigation directions that direct the driver from the origin location to the destination location without entering a location associated with a driving restriction that applies to the user may be presented on the map display and may be selected by the user.

For example, if a driving restriction associated with First Street applies to the user, then a first set of navigation directions that directs the user to turn right on Main Street from the origin location, then turn left on First Street, then turn right on Sixth Street to reach the destination location may be filtered out from the sets of navigation directions provided to the user. On the other hand, a second set of navigation directions that directs the user to turn right on Main Street from the origin location, then turn left on Third Street, then turn right on Fourth Street, then turn left on Fifth Street, then turn right on Sixth Street to reach the destination location may be presented on the map display, because First Street is not included in this set of navigation directions. A third set of navigation directions that directs the user to turn left on Main Street from the origin location, turn right on Town Street, then turn right on Sixth Street to reach the destination location may also be presented on the map display, because First Street is also not included in this set of navigation directions. Accordingly, the user may select one of the second and third sets of navigation directions based on any number of factors, such as shortest distance, shortest time, or any other suitable factors.

In other embodiments, the first set of navigation directions is also presented on the map display by the navigation application 154. However, the route corresponding to the first set of navigation directions is presented with an indication of the segment of the route associated with a driving restriction and a warning regarding the driving restriction.

In any event, different users may be provided with different (i.e., customized) navigation directions even when they each request navigation directions from the same origin location and destination location. For example, if a driving restriction associated with Third Street applies to a second user, but the restriction associated with First Street discussed in the example above does not apply to the second user, the first set of navigation directions from Point A to Point B and the third set of navigation directions from Point A to Point B may be presented on the map display by the navigation application 154 for the second user, while the second set of navigation directions from Point A to Point B is not presented. In this case, the first set of navigation directions may be presented on the second user's map display, despite being filtered from the first user's map display.

At block 414, the identified set of navigation directions may be provided to the user of the electronic device to navigate the user from the origin location to the destination location while avoiding locations associated with driving restrictions. The identified set of navigation directions may include a notification or warning indicating that the navigation directions include one or more detours based on driving restrictions that apply to the user. This may particularly helpful as an explanation to a user traveling between regions that have different driving restrictions.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for establishing communication sessions related to navigation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for generating navigation directions to avoid areas having location-dependent driving restrictions, comprising:
    receiving, by an electronic device, a user request for navigation directions from an origin location to a destination location;
    determining, by a navigation application of the electronic device, one or more sets of navigation directions, each of which directs a user of the electronic device from the origin location to the destination location;
    comparing, by the electronic device, one or more of: the origin location, the destination location, or the one or more sets of navigation directions to locations associated with a plurality of driving restrictions, each of the plurality of driving restrictions associated with a different set of rules, to identify a driving restriction related to air quality from among the plurality of driving restrictions that applies to the user request for navigation directions;
    prompting, by the electronic device, the user of the electronic device to provide information related to the identified driving restriction;
    determining, by the electronic device, based on the information and the set of rules associated with the identified driving restriction, that the identified driving restriction applies to the user of the electronic device;
    identifying, by the electronic device, a set of navigation directions of the one or more sets of navigation directions that avoids the locations associated with the identified driving restriction that applies to the user of the electronic device; and
    providing, by the electronic device, the identified set of navigation directions to the user of the electronic device to avoid the locations associated with the identified driving restriction.

2. The computer-implemented method of claim 1, wherein the origin location is associated with a first driving restriction having a first set of rules, and wherein the destination location is associated with a second driving restriction having a second set of rules.

3. The computer-implemented method of claim 1, further comprising:
    providing, by the electronic device, an indication of a warning to the user when one or more of: (i) a current location of the user; (ii) the origin location; (iii) the destination location; or (iv) the one or more sets of navigation directions is associated with the identified driving restriction.

4. The computer-implemented method of claim 1, wherein the sets of rules associated with each of the plurality of driving restrictions include one or more of:
- a rule restricting a vehicle from one or more locations based on current air pollution levels in the one or more locations;
- a rule restricting a vehicle from one or more locations based on whether the user has a permit associated with each location;
- a rule restricting a vehicle from one or more locations based on a license plate number associated with the vehicle;
- a rule restricting a vehicle from one or more locations based on a type of the vehicle; or
- a rule restricting a vehicle from one or more locations based on an age of the vehicle.

5. The computer-implemented method of claim 1, wherein determining that the identified driving restriction applies to the user of the electronic device is further based on a date and/or a time that the user will be in a location associated with the identified driving restriction.

6. The computer-implemented method of claim 1, further comprising:
- receiving an indication of a change in or a removal of one of the plurality of driving restrictions, based on input from one or more other users.

7. The computer-implemented method of claim 1, wherein the one or more sets of navigation directions include a plurality of maneuvers for directing the user from the origin location to the destination location, and each set of navigation directions includes a different set of maneuvers.

8. An electronic device for generating navigation directions to avoid areas having location-dependent driving restrictions, comprising: one or more processors and a non-transitory computer-readable memory storing thereon instructions that, when executed by the one or more processors, cause the server device to:
- receive a user request for navigation directions from an origin location to a destination location;
- determine one or more sets of navigation directions, each of which directs a user of the electronic device from the origin location to the destination location;
- compare one or more of: the origin location, the destination location, or the one or more sets of navigation directions to locations associated with a plurality of driving restrictions, each of the plurality of driving restrictions associated with a different set of rules, to identify a driving restriction related to air quality from among the plurality of driving restrictions that applies to the user request for navigation directions;
- prompt the user of the electronic device to provide information related to the identified driving restriction;
- determine, based on the information and the set of rules associated with the identified driving restriction, that the identified driving restriction applies to the user of the electronic device;
- identify a set of navigation directions of the one or more sets of navigation directions that avoids the locations associated with the identified driving restriction that applies to the user of the electronic device; and
- provide the identified set of navigation directions to the user of the electronic device to avoid the locations associated with the identified driving restriction.

9. The electronic device of claim 8, wherein the origin location is associated with a first driving restriction having a first set of rules, and wherein the destination location is associated with a second driving restriction having a second set of rules.

10. The electronic device of claim 8, wherein the instructions further cause the electronic device to:
- provide an indication of a warning to the user when one or more of: (i) a current location of the user; (ii) the origin location; (iii) the destination location; or (iv) the one or more sets of navigation directions is associated with the identified driving restriction.

11. The electronic device of claim 8, wherein the sets of rules associated with each of the plurality of driving restrictions include one or more of:
- a rule restricting a vehicle from one or more locations based on current air pollution levels in the one or more locations;
- a rule restricting a vehicle from one or more locations based on whether the user has a permit associated with each location;
- a rule restricting a vehicle from one or more locations based on a license plate number associated with the vehicle;
- a rule restricting a vehicle from one or more locations based on a type of the vehicle; or
- a rule restricting a vehicle from one or more locations based on an age of the vehicle.

12. The electronic device of claim 8, wherein the instructions further cause the electronic device to determine that the identified driving restriction applies to the user of the electronic device is based on a date and/or a time that the user will be in a location associated with the identified driving restriction.

13. The electronic device of claim 8, wherein the instructions further cause the electronic device to receive an indication of a change in or a removal of one of the plurality of driving restrictions, based on input of one or more other users.

14. The electronic device of claim 8, wherein the one or more sets of navigation directions include a plurality of maneuvers for directing the user from the origin location to the destination location, and each set of navigation directions includes a different set of maneuvers.

15. A non-transitory computer-readable medium storing instructions for generating navigation directions to avoid areas having location-dependent driving restrictions that, when executed by one or more processors in an electronic device, cause the one or more processors to:
- receive a user request for navigation directions from an origin location to a destination location;
- determine one or more sets of navigation directions, each of which directs a user of the electronic device from the origin location to the destination location;
- compare one or more of: the origin location, the destination location, or the one or more sets of navigation directions to locations associated with a plurality of driving restrictions, each of the plurality of driving restrictions associated with a different set of rules, to identify a driving restriction related to air quality from among the plurality of driving restrictions that applies to the user request for navigation directions;
- prompt the user of the electronic device to provide information related to the identified driving restriction;
- determine, based on the information and the set of rules associated with the identified driving restriction, that the identified driving restriction applies to the user of the electronic device;

identify a set of navigation directions of the one or more sets of navigation directions that avoids the locations associated with the identified driving restriction that applies to the user of the electronic device; and provide the identified set of navigation directions to the user of the electronic device to avoid the locations associated with the identified driving restriction.

16. The computer-readable medium of claim 15, wherein the origin location is associated with a first driving restriction having a first set of rules, and wherein the destination location is associated with a second driving restriction having a second set of rules.

17. The computer-readable medium of claim 15, wherein the instructions further cause the electronic device to:

provide an indication of a warning to the user when one or more of: (i) a current location of the user; (ii) the origin location; (iii) the destination location; or (iv) the one or more sets of navigation directions is associated with the identified driving restriction.

18. The computer-readable medium of claim 15, wherein the sets of rules associated with each of the plurality of driving restrictions include one or more of:

a rule restricting a vehicle from one or more locations based on current air pollution levels in the one or more locations;

a rule restricting a vehicle from one or more locations based on whether the user has a permit associated with each location;

a rule restricting a vehicle from one or more locations based on a license plate number associated with the vehicle;

a rule restricting a vehicle from one or more locations based on a type of the vehicle; or a rule restricting a vehicle from one or more locations based on an age of the vehicle.

19. The computer-readable medium of claim 15, wherein the instructions further cause the electronic device to determine that the identified driving restriction applies to the user of the electronic device is based on a date and/or a time that the user will be in a location associated with the identified driving restriction.

20. The computer-readable medium of claim 15, wherein the instructions further cause the electronic device to receive an indication of a change in or a removal of one of the plurality of driving restrictions, based on input of one or more other users.

* * * * *